US010515146B2

(12) United States Patent
Kamel et al.

(10) Patent No.: US 10,515,146 B2
(45) Date of Patent: Dec. 24, 2019

(54) MULTI-TEMPLATE KIT SYSTEM AND PROCESS (71) Applicant: Elateral, Inc., Westchester, IL (US)

(72) Inventors: Alexandre Perry Kamel, Castle Pines, CO (US); Peter Blackburn, Farnham (GB); Paul Goater, Farnham (GB)

( * ) Notice: Subject to any disclaimer, the term of this patent is extended or adjusted under 35 U.S.C. 154(b) by 130 days.

(21) Appl. No.: 14/777,691

(22) PCT Filed: Mar. 21, 2014

(86) PCT No.: PCT/US2014/031403
§ 371 (c)(1),
(2) Date: Sep. 16, 2015

(87) PCT Pub. No.: WO2014/153492
PCT Pub. Date: Sep. 25, 2014

(65) Prior Publication Data
US 2016/0283459 A1 Sep. 29, 2016

Related U.S. Application Data (60) Provisional application No. 61/852,752, filed on Mar. 21, 2013.

(51) Int. Cl.
*G06F 17/24* (2006.01)
*G06Q 50/00* (2012.01)
(Continued)

(52) U.S. Cl.
CPC .......... *G06F 17/248* (2013.01); *G06F 16/958* (2019.01); *G06F 17/211* (2013.01);
(Continued)

(58) Field of Classification Search
CPC .. G06F 17/248; G06F 17/211; G06F 17/2235; G06F 17/3089; G06Q 50/01
(Continued)

(56) References Cited

U.S. PATENT DOCUMENTS 5,852,731 A * 12/1998 Wang .................. G06F 9/52
718/100
6,112,242 A * 8/2000 Jois .................. G06F 16/958
709/225

(Continued)

FOREIGN PATENT DOCUMENTS

| JP | 09-198370 | 7/1997 |
| KR | 10-2005-0022992 | 3/2005 |
| KR | 10-2005-0071998 | 7/2005 |

*Primary Examiner* — Stephen S Hong
*Assistant Examiner* — Broderick C Anderson
(74) *Attorney, Agent, or Firm* — Leyendecker & Lemire, LLC (57) ABSTRACT

A multi-template kit system and process are described. The multi-template kit system can include a server, a database, a network, and a user device. The multi-template kit system can be implemented to provide a database of template kits having interconnected content objects. The multi-template kit process can include, but is not limited to, creating a kit having a plurality of templates. Each of the templates can include on or more content objects. When a content object is included in more than one template, each time the content object is updated, the update can be applied to each template having the content object. As such, updates can be made to each template included in the kit when a content object is updated.

15 Claims, 6 Drawing Sheets (51) Int. Cl.
*G06Q 30/02* (2012.01)
*G06F 16/958* (2019.01)
*G06F 17/21* (2006.01)
*G06F 17/22* (2006.01)

(52) U.S. Cl.
CPC ......... *G06F 17/2235* (2013.01); *G06Q 30/02* (2013.01); *G06Q 30/0201* (2013.01); *G06Q 50/01* (2013.01)

(58) Field of Classification Search
USPC .......................................................... 715/205
See application file for complete search history.

(56) References Cited

U.S. PATENT DOCUMENTS

| | | | |
|---|---|---|---|
| 8,205,151 B2* | 6/2012 | Smith | G06F 17/227 |
| | | | 715/236 |
| 9,953,007 B2* | 4/2018 | Oyarzabal | G06F 17/211 |
| 2002/0059278 A1* | 5/2002 | Bailey | G06F 17/211 |
| 2003/0014442 A1* | 1/2003 | Shiigi | G06F 8/20 |
| | | | 715/255 |
| 2004/0268231 A1 | 12/2004 | Tunning | |
| 2006/0026634 A1 | 2/2006 | Lachapelle et al. | |
| 2006/0200751 A1* | 9/2006 | Underwood | G06F 17/3089 |
| | | | 715/205 |
| 2007/0220419 A1* | 9/2007 | Stibel | G06F 16/9577 |
| | | | 715/234 |
| 2011/0029482 A1* | 2/2011 | Gimson | G06F 16/30 |
| | | | 707/624 |

\* cited by examiner

MULTI-TEMPLATE KIT SYSTEM AND PROCESS

CROSS-REFERENCE TO RELATED APPLICATION

This application claims the benefit of U.S. Provisional Application No. 61/852,752, filed Mar. 21, 2013.

BACKGROUND

Multi-channel and multi-media communications consist of one or more communications across one or more communications channels or media formats. For example, a multi-channel, multi-media, or multi-element communication, hereinafter referred to as "multi-channel communication(s)," might consist of an email, a web landing page, a social page, a mobile coupon, a window poster, a print advertisement, and/or a billboard.

For many marketing and advertising initiatives including promotions, campaigns, and the like, it is desirable that multi-channel communications be coordinated in terms of look, feel, style, copy, content, product offering, pricing, and other aspects of the various communication elements. For instance, various communication elements can share characteristics across a group of elements. In another instance, characteristics can be coordinated, controlled, and/or intentional. Communications generally include one or more assets that make up the communication. Assets can include, but are not limited to, photographic images, artwork, headlines, body copy, call to action, colors, dimensions, layouts, templates, etc. A typical communication generally involves (i) an assembly of one or more assets and (ii) a delivery of the assets via one or more media or medium.

As multi-channel relevant marketing drives orders of magnitude more content, an ability to increase speed, flexibility, and control associated with designing and producing communications, while at the same time dramatically reducing costs of design and production, is essential. Therefore, it is desirable to have a system for universally updating individual components of a communications initiative across each communication.

DETAILED DESCRIPTION

Embodiments of the present invention include a process and a system for implementing intelligent templates in a communications campaign. The intelligent templates can typically be compiled into collections or kits that each follow a defined set of rules. Generally, the templates can include logical coding that can specify rules governing selection and presentation of various content objects in each template of the collection. Content objects can include, but are not limited to, images, text boxes, background color, logos, artwork, photographic elements, and other objects appearing in a template. Embodiments of the present invention can be implemented with multi-channel one-way communications or interactive two-way communications each in a multi-channel context spanning traditional and digital media. For instance, communications channels can include, but are not limited to, email, websites, social pages, billboards, point of sale materials, print media, 2-dimensional barcode capture, sales data, 2-dimensional barcode scans, and coupon redemptions.

In one embodiment, logical coding can be implemented to specify rules across a collection of templates. For instance, logical coding can be implemented to enforce desired consistency across various templates or to enforce logical relationships governing selection and presentation of content objects appearing across a collection of templates. Generally, logical rules can include, but are not limited to, if-then-else statements, inclusion, exclusion, and other relational or logical rules.

Typically, the process can include creating a kit by selecting multiple templates representing an arbitrary variety of media channels. Media channels can include, but are not limited to, web, email, mobile, print, etc. In one embodiment, the process can designate templates as belonging to a collection and establish rules governing relationships between and among the collection of templates and various assets included in the collection of templates. For instance, photographic images, artwork, product features, pricing information, and other characteristics of templates included in the collection of templates can be governed by various logical relationships, business rules, artistic standards, creative standards, branding standards, and other rules to achieve an objective with regard to the kit or to a collection of communication elements that can be produced by virtue of intelligence and/or logic associated with the templates. In one embodiment, actions taken for one template can flow through a specified number of other templates in the kit.

Generally, a subset of rules can be implemented to establish consistency among the collection of templates. For instance, subsets of rules can be implemented for logical constraints, dependencies, and other relationships. For example, if a certain image appears on one template, the image should appear similar on any other template in the collection having the image. In another example, if a certain product offering appears in one template, the product offering should appear with identical terms on other templates in the collection. In yet another example, rules may be implemented so that a disclaimer (or similar compliance language) be consistently applied where needed across the collection of templates.

Embodiments of the present invention can provide several benefits. First, the present invention can significantly reduce time and costs required to design and produce a set of communication materials. For instance, by manipulating one template and having actions or decisions cascading across other templates in the kit, a one-to-many design and production process can be created. Second, the present invention can facilitate an establishment and an enforcement of design standards, compliance requirements, and other rules intended to govern relationships between and among various content objects within templates that are within a collection of templates. Third, the present invention can reduce time and cost needed to update or edit a collection of templates.

The present invention can be embodied as devices, systems, methods, and/or computer program products. Accordingly, the present invention can be embodied in hardware and/or in software (including firmware, resident software, micro-code, etc.). Furthermore, the present invention can take the form of a computer program product on a computer-usable or computer-readable storage medium having computer-usable or computer-readable program code embodied in the medium for use by or in connection with an instruction execution system. In one embodiment, the present invention can be embodied as non-transitory computer-readable media. In the context of this document, a computer-usable or computer-readable medium can include, but is not limited to, any medium that can contain, store, communicate, propagate, or transport the program for use by or in connection with the instruction execution system, apparatus, or device.

The computer-usable or computer-readable medium can be, but is not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), an erasable programmable read-only memory (EPROM or Flash memory), an optical fiber, a portable compact disc read only memory (CD-ROM), and a digital video disk read only memory (DVD-ROM). Note that the computer-usable or computer-readable medium could even be paper or another suitable medium upon which the program is printed, as the program can be electronically captured, via, for instance, optical scanning of the paper or other medium, then compiled, interpreted, of otherwise professed in a suitable manner, if necessary, and then stored in a computer memory.

Terminology

The terms and phrases as indicated in quotation marks (" ") in this section are intended to have the meaning ascribed to them in this Terminology section applied to them throughout this document, including in the claims, unless clearly indicated otherwise in context. Further, as applicable, the stated definitions are to apply, regardless of the word or phrase's case, to the singular and plural variations of the defined word or phrase.

The term "or" as used in this specification and the appended claims is not meant to be exclusive; rather the term is inclusive, meaning either or both.

References in the specification to "one embodiment", "an embodiment", "another embodiment, "a preferred embodiment", "an alternative embodiment", "one variation", "a variation" and similar phrases mean that a particular feature, structure, or characteristic described in connection with the embodiment or variation, is included in at least an embodiment or variation of the invention. The phrase "in one embodiment", "in one variation" or similar phrases, as used in various places in the specification, are not necessarily meant to refer to the same embodiment or the same variation.

The term "couple" or "coupled" as used in this specification and appended claims refers to an indirect or direct physical connection between the identified elements, components, or objects. Often the manner of the coupling will be related specifically to the manner in which the two coupled elements interact.

The term "directly coupled" or "coupled directly," as used in this specification and appended claims, refers to a physical connection between identified elements, components, or objects, in which no other element, component, or object resides between those identified as being directly coupled.

The term "approximately," as used in this specification and appended claims, refers to plus or minus 10% of the value given.

The term "about," as used in this specification and appended claims, refers to plus or minus 20% of the value given.

The terms "generally" and "substantially," as used in this specification and appended claims, mean mostly, or for the most part.

Directional and/or relationary terms such as, but not limited to, left, right, nadir, apex, top, bottom, vertical, horizontal, back, front and lateral are relative to each other and are dependent on the specific orientation of a applicable element or article, and are used accordingly to aid in the description of the various embodiments and are not necessarily intended to be construed as limiting.

The term "software," as used in this specification and the appended claims, refers to programs, procedures, rules, instructions, and any associated documentation pertaining to the operation of a system.

The term "firmware," as used in this specification and the appended claims, refers to computer programs, procedures, rules, instructions, and any associated documentation contained permanently in a hardware device and can also be flashware.

The term "hardware," as used in this specification and the appended claims, refers to the physical, electrical, and mechanical parts of a system.

The terms "computer-usable medium" or "computer-readable medium," as used in this specification and the appended claims, refers to any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

The term "signal," as used in this specification and the appended claims, refers to a signal that has one or more of its characteristics set or changed in such a manner as to encode information in the signal. It is to be appreciated that wireless means of sending signals can be implemented including, but not limited to, Bluetooth, Wi-Fi, acoustic, RF, infrared and other wireless means.

The terms "content analytics" or "asset analytics," as used in this specification and the appended claims, refer to an assessment and characterization of an asset's demonstrated capacity to contribute to an effectiveness of a communications initiative under a variety of communications contexts with regard to an achievement of a variety of desired outcomes, whether for discrete initiatives, types of initiatives, or cumulative impact across all initiatives where the asset has participated over a span of time.

The term "communications campaign," as used in this specification and the appended claims, refers to a marketing campaign, an advertising campaign, a public service announcement, etc. The communications campaign can include one or more communications.

The term "communication," as used in the specification and the appended claims, refers to any type of media adapted to present information.

The term "element," as used in the specification and the appended claims, refers to an instance of a template. An element can include, but is not limited to, a customized version of a template.

An Embodiment of a Multi-Template Kit Process

Figure 1:
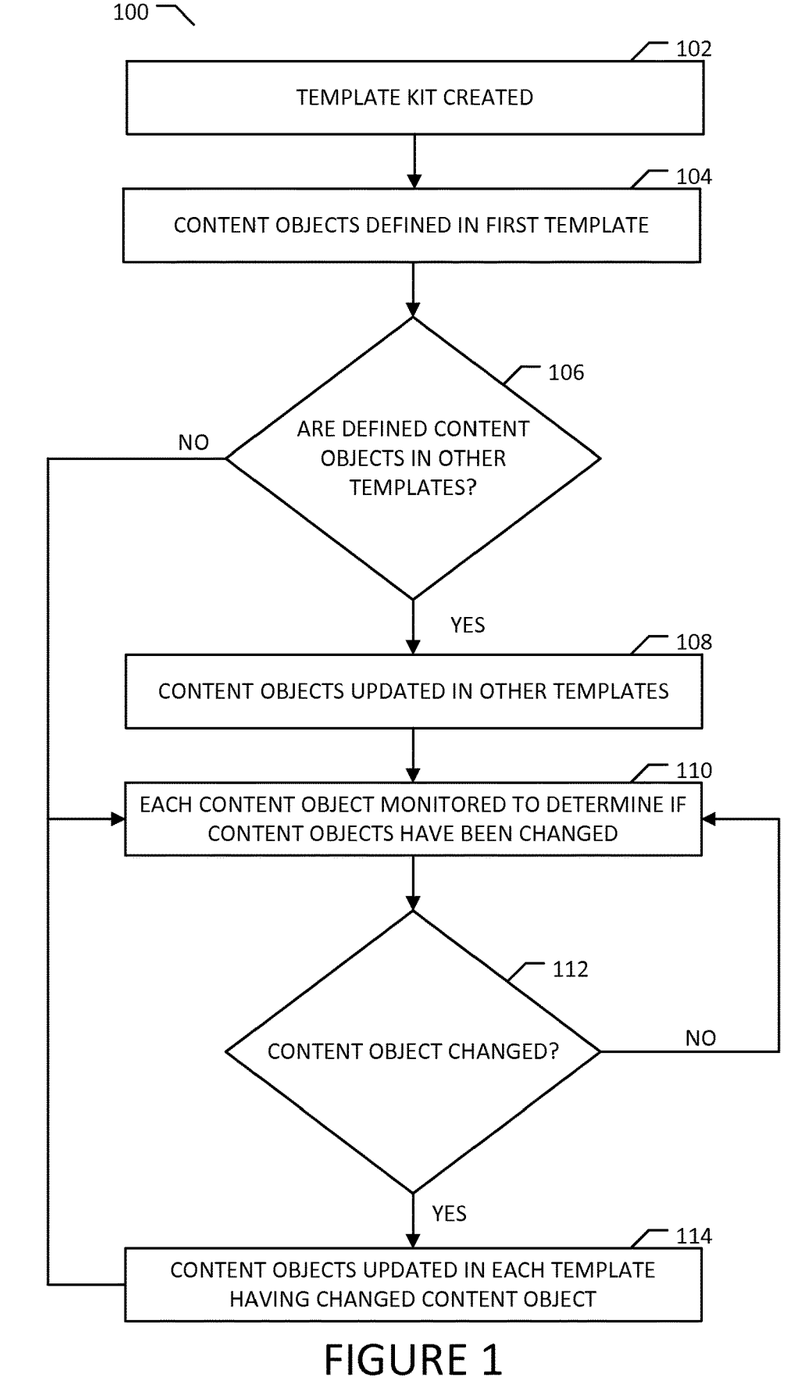
FIG. 1 is a flow chart of a multi-template kit process according to one embodiment of the present invention.

Referring to FIG. 1, a flow chart of a method or process 100 is illustrated. The process 100 can be implemented to update one or more content objects in one or more templates included in a kit. Generally, content objects can include, but are not limited to, text, image, photos, logos, links, video and/or other content and media. A template can generally represent a document or communication including, but not limited to, web pages, banner advertisements, social pages, email pages, posters, billboards, print advertisements, three-dimensional marketing displays, and product packages.

In block 102, a kit can be created. The kit can generally include a plurality of templates regulated by one or more pre-defined rules. One embodiment of creating a kit is described hereinafter in further detail.

After the kit has been created, the process 100 can move to block 104. In block 104, content objects included in a first template can be defined. For example, the first template may include four content objects. The first content object may be an image, the second content object may be a text box, the third content object may be an image, and the fourth content object may be a text box. A user may define what each of the content objects will be. For instance, the first content object can be an image of a dog. The user can define each of the content objects included in the first template.

After the content objects are defined, the process 100 can move to decision block 106. In decision block 106, if any of the defined content objects are included in other templates of the kit, the process 100 can move to block 108. If none of the defined content objects are included in other templates, the process 100 can move to block 110.

In block 108, content objects can be updated in each template having content objects defined in the first template. For instance, if a second template and a fourth template each included the first content object, the first content object would be updated to an image of a dog in the second template and the fourth template.

Each of the content objects can be monitored to determine if any of the content objects have been changed in block 110. It is to be appreciated that a variety of means can be implemented to monitor each content object. For instance, a process can be implemented to check metadata of a content object against metadata of the same content object from a previous check to determine if there are any changes. In another instance, content objects can be configured to notify a system manager when a change has been made. The system manager can be adapted to change the content object in other templates having the content object.

In decision block 112, a determination can be made whether a content object has been altered, updated, or changed in a template. If a content object has been updated, the process 100 can move to block 114. If a content object has not been updated, the process 100 can return to block 110.

In block 114, content objects can be updated in each template having the changed content object. For instance, if the content object is a first image and the content object has been changed to a second image, each template having the first image can be updated with the second image. In some embodiments, the process 100 can automatically change content objects in other templates. In one embodiment, the process 100 can request permission to update each of the templates.

After the content objects are updated in block 114, the process 100 can return to block 110. Generally, the process 100 can be implemented to continuously monitor content objects in the kit and update them as needed.

Figure 2A:
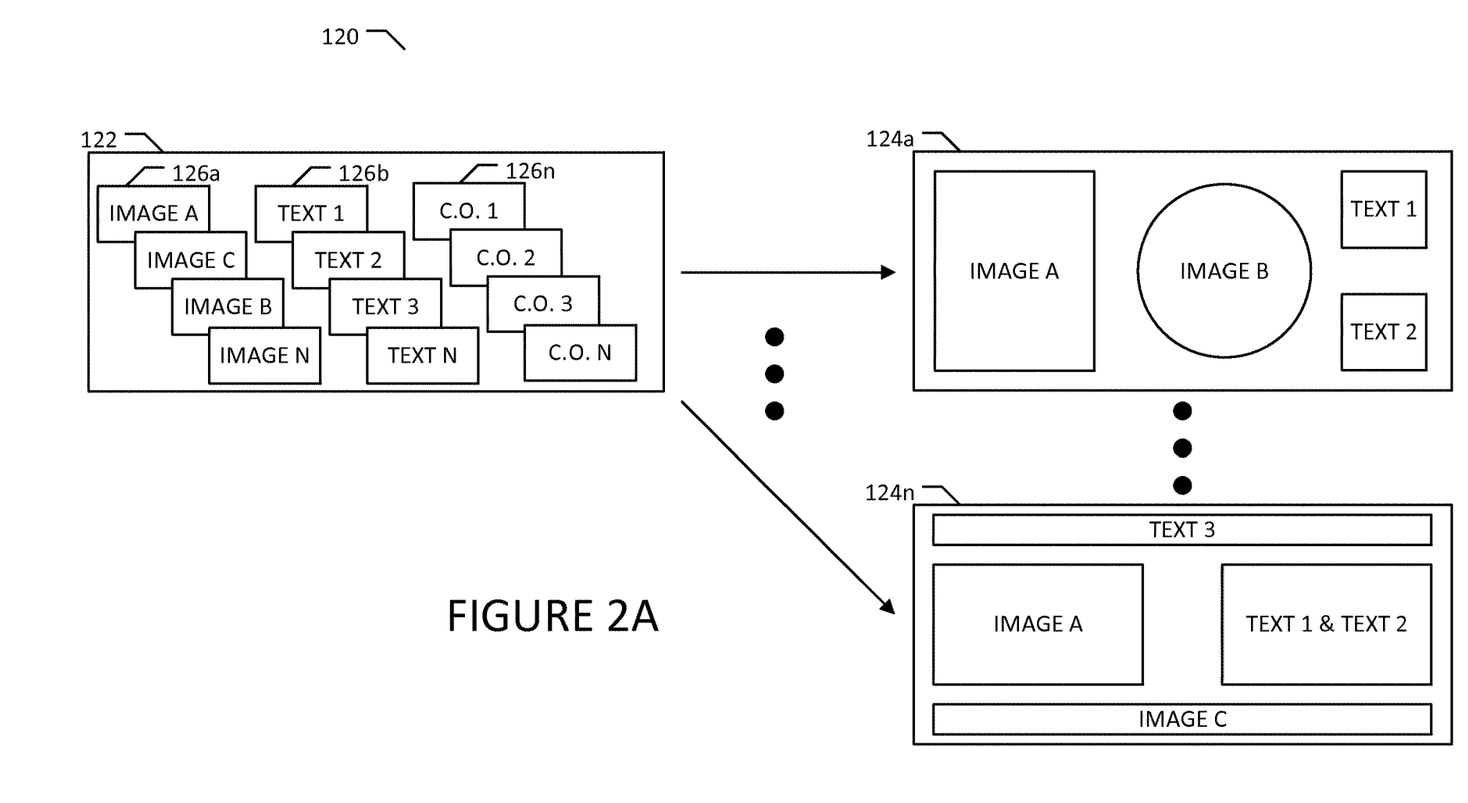
FIG. 2A is a graphical representation of a multi-template kit having a master template according to one embodiment of the present invention.

Referring to FIG. 2A, a diagram of a chart 120 illustrating a master template updating content objects in a plurality of templates is shown. FIG. 2A is one embodiment of how the present invention can be implemented.

As shown, a master template 122 and a plurality of templates 124a-124n can include a plurality of content objects 126a-126n. Generally, the master template 122 can include each of the plurality of content objects 126a-126n included in the plurality of templates 124a-124n. The plurality of templates 124a-124n can each include one or more of the plurality of content objects 126a-126n. For instance, the first template 124a can include five content objects and the second template 124n can include five content objects.

In practice, once one of the content objects 126a-126n are defined or updated in the master template 122, the change can be made to each of the templates 124a-124n having the content object. For instance, if the content object "IMAGE A" is defined in the master template 122, each of the templates 124a-124n having the "IMAGE A" content object can be updated to include the selected image for the content object "IMAGE A." As an example, if the content object "IMAGE A" is selected to be an image of a cow in the master template 122, each of the templates 124a-124n having the content object "IMAGE A" will be updated to the selected image of the cow.

Generally, each of the content objects 126a-126n can be defined, updated, and/or selected in the master template 122. For instance, a designer may select an appropriate file for each content object in the master template 122. As the designer is selecting the content objects, the content objects can be updated in each of the templates 124a-124n. Further, if the designer makes a change to the master template 122, such as select a different image for one of the content objects, the change can be effectuated for each of the templates 124a-124n having the content object.

In one embodiment, a change made to any content object associated with any template within the kit, whether the template is the master template or any other template, would flow through to corresponding content objects included in other templates within the kit.

Figure 2B:
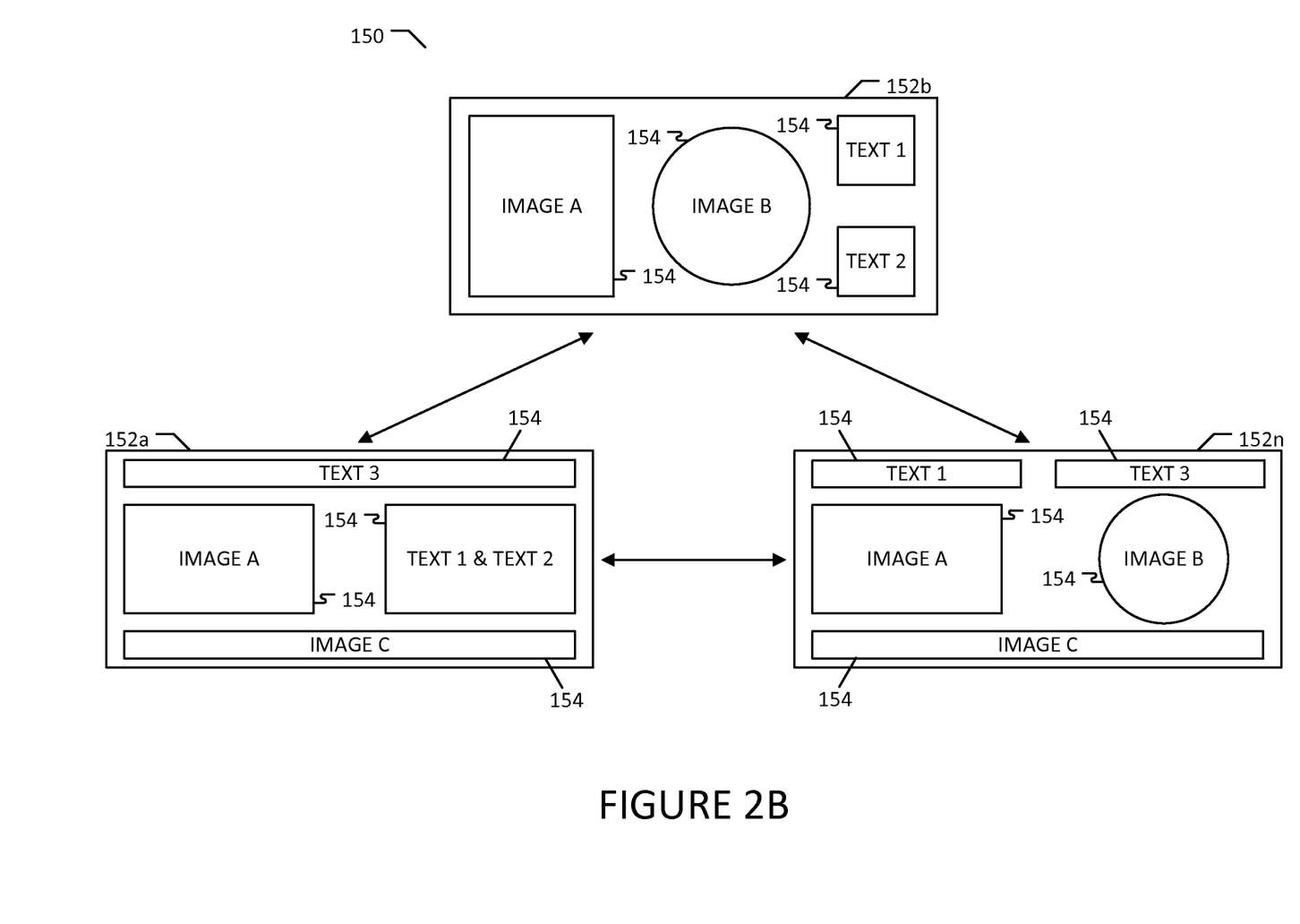
FIG. 2B is a graphical representation of a multi-template kit according to one embodiment of the present invention.

Referring to FIG. 2B, a diagram of a chart 150 illustrating a plurality of templates having interconnected content objects is shown. In one embodiment, the interconnected content objects can be linked together. Typically, the plurality of templates can be implemented in a communications campaign across a variety of media. For instance, one of the templates can be a digital communication, one of the templates can be a print communication, and one of the templates can be a display communication. As shown, the chart 150 represents a plurality of templates 152a-152n each having one or more content objects 154 that are interconnected to each other.

Generally, the content objects 154 can be interconnected whereby when a content object is updated, changed, defined, and/or selected in one template, and included in at least two templates, the change will be made to the content object in the templates having the content object. For instance, if the content object "IMAGE A" is updated in a first template 152a, each template having content object "IMAGE A" will be updated with the change to the content object "IMAGE A." As an example, if a user selects an image of a building for the content object "IMAGE A" in the first template 152a, the change will be made to the content object "IMAGE A" in a second template 154*b* and a third template 154*n*.

In some embodiments, each of the content objects 154 can have their own rules associated with being a part of a template. For instance, an image content object can have different image resolutions in different templates. For example, the content object "IMAGE A" in the second template 152*b* may have a 1280×720 max resolution and the content object "IMAGE A" in the third template 152*n* may have a 1920×1080 max resolution. In another example, the content object "TEXT 1" in the first template 152*a* may be limited to Times New Roman font, whereas the content object "TEXT 1" in the third template 152*n* may be limited to Calibri font. As such, when one of the content objects 154 is updated in a template, the content object will be updated according to any rules in each of the templates having the content object.

An Embodiment of a Process for Defining a Kit

Figure 3:
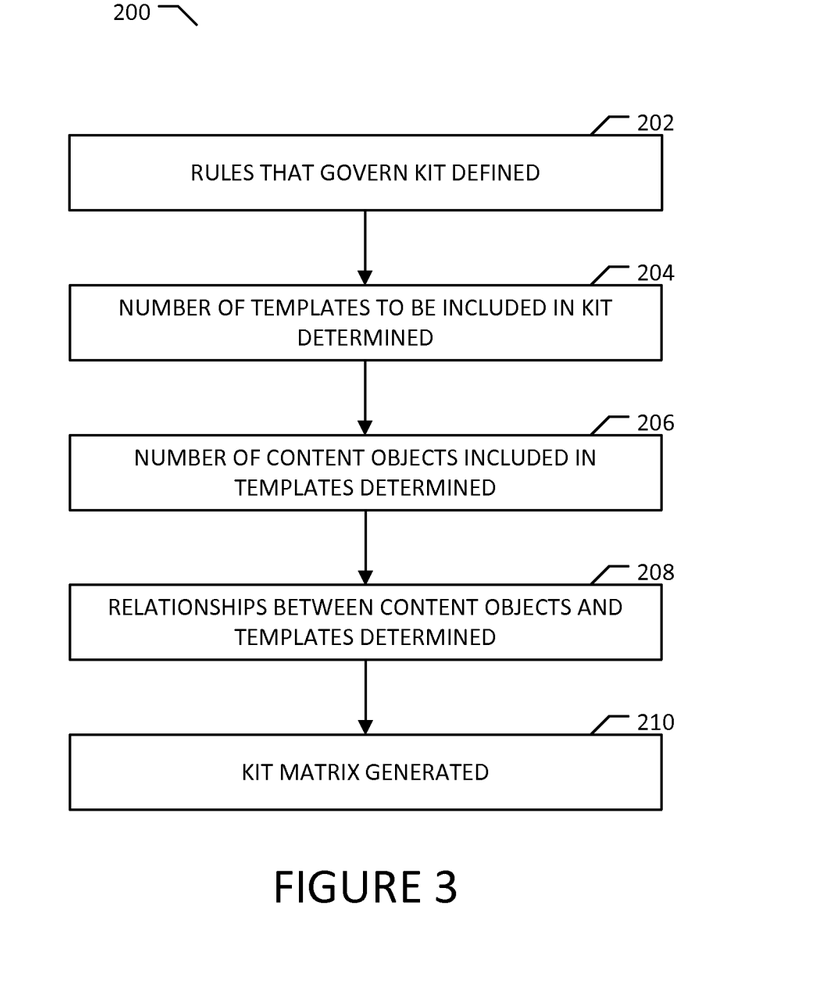
FIG. 3 is a flow chart of a kit definition process according to one embodiment of the present invention.

Referring to FIG. 3, a flow chart of a method or process 200 is illustrated. The process 200 can be implemented to create a kit. A kit can include one or more templates adapted to be used in a communications campaign. In one embodiment, the process 200 can include creating a kit matrix for the kit. Generally, the kit matrix can be implemented to map content objects included in a kit. For instance, the kit matrix can be implemented to determine which templates need to be updated when a content object is changed, altered, or updated.

In block 202, rules implemented to govern a kit can be defined. It is to be appreciated that there are a plurality of rules and/or relationships that can govern the kit, a composition of the kit, and relationships between and among templates in the kit. For example, a collection of templates may share a common photographic imagery, a common text headline, and common pricing information. Typically, rules can be adapted to allow a selection made for any one template of the kit to flow through the other templates in the kit. For instance, the kit can be customized all at once rather than one template at a time.

A number of templates to be included in the kit can be determined in block 204. Generally, the kit can include a variety of templates adapted for a plurality of media types and communication channels. For instance, templates can be implemented for communications including, but not limited to, internet campaigns, print campaigns, and mobile campaigns. Templates can include, but are not limited to, media templates, print templates, paper templates, patterns, stencils, pre-developed layouts, form letters, pre-formatted documents, structured frameworks and/or structured layouts.

After the number of templates in the kit is determined, a number of content objects included in the templates can be determined in block 206. Generally, each template can be comprised of one or more content objects. Content objects can include, but are not limited to, images, plain text boxes, free text boxes, WYSIWYG text boxes, and backgrounds. It is to be appreciated that a template can have a variety of types of content objects.

In block 208, relationships between content objects and templates can be determined. For instance, each template a content object is included in can be determined. It is to be appreciated that a content object can be included in a plurality of templates. In another instance, a content object may be subjected to different rules based on which template the content object is included in. For example, a first content object that is a text box and included in two templates may have a different font type or size in the two templates.

After relationships between the content objects and the templates have been determined, a kit matrix can be generated in block 210. Generally, the kit matrix can be implemented to facilitate a definition and a management of relationships between content objects appearing in one or more templates of a kit. In one embodiment, the kit matrix can include a mapping of content objects with templates of the kit.

Generally, the kit matrix can be implemented to identify which content objects are associated with which templates in a kit. For instance, the kit matrix can be adapted to map content objects included in each template in a kit. It is to be appreciated that the kit matrix can be implemented in a variety of methods including, but not limited to, tabular representations of relationships, connection diagrams, or other methods that specify relationships between and among various content objects across a range of templates or communication elements.

In one embodiment, attributes can be implemented to characterize content objects and templates. Generally, a pairing of a content object and a template can have characteristics that can be identified and managed. For example, a first content object can be an image that appears in a plurality of templates. The first content object in a first template may have different parameters from the first content object in a second template. For instance, the first content object in the first template can be high-resolution whereas the first content object is low-resolution in the second template. In another instance, the first content object may be cropped in the first template and not in a third template. The kit matrix can be implemented to attribute properties and/or differentials associated with an intersection of content objects to templates including, but not limited to, whether a content object in one template has different properties when included in other templates.

In one embodiment, the kit matrix can be a matrix cell including a plurality of amplifying information characterizing relationships of a content object in different templates relative to a reference. For instance, one template may be designated as a master and variations of a content object can be defined for other templates that include the content object.

Generally, when a content object is defined for one template, the content object can be defined automatically for other templates of the kit that include the content object. In one embodiment, the content object can be defined subject to any adjustments as reflected in properties associated with content object-template pairings that may be defined. It is to be appreciated that definitions can be captured within tabular or any number of other relational or spatial methods. The definitions can be adapted to capture relationships between content objects and information characterizing the content objects and relationships between and among the content objects, templates, and related properties. Typically, once a kit is constructed, subsequent edits of content objects may also be updated to each template in the kit.

In one embodiment, changes to a content object in any template in a kit would flow through to other templates having the corresponding content objects. In another embodiment, one or more templates can be designated as master templates and one or more templates as sub-templates. Typically, changes to any number of master templates can cascade to any number of associated sub-templates.

Figure 4A:
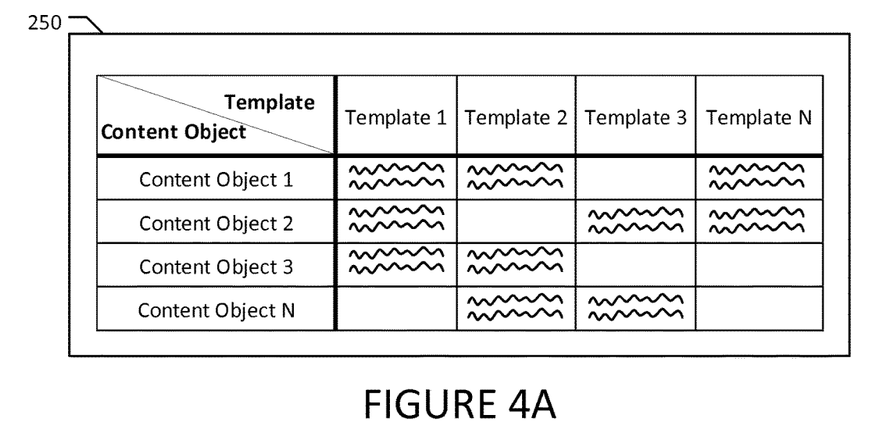
FIG. 4A is a graphical representation of a kit matrix table according to one embodiment of the present invention.
Figure 4B:
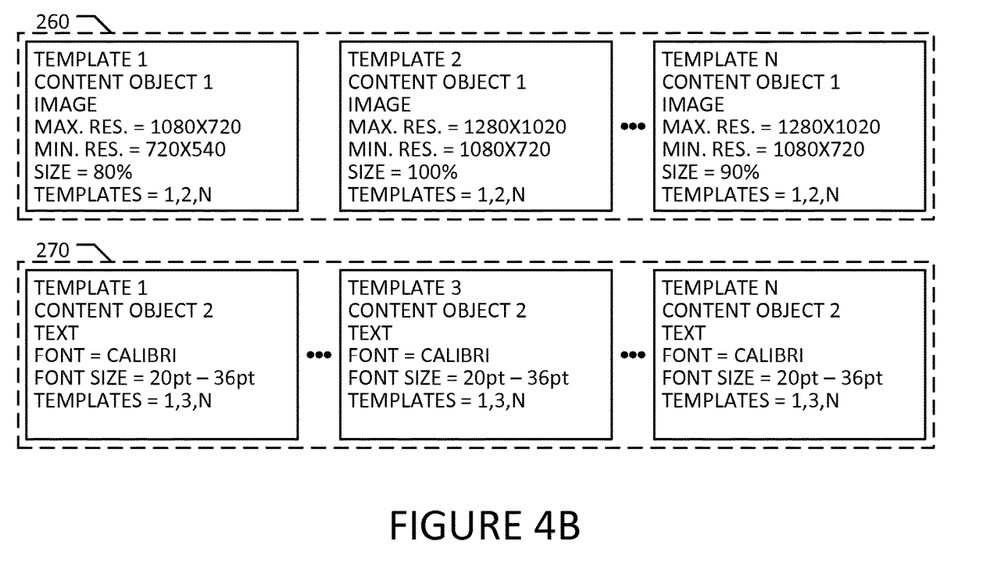
FIG. 4B is a graphical representation of a plurality of cells from a kit matrix table according to one embodiment of the present invention.

Referring to FIG. 4A, a matrix chart 250 illustrating one example of a kit matrix is illustrated. Referring to FIG. 4B, a first example chart 260 illustrating information or parameters about "Content Object 1" and a second example chart 270 illustrating information or parameters about "Content Object 2" are shown. It is to be appreciated that the information included in the first example chart 260 and the second example chart 270 are for illustrative purposes only and not meant to be limiting.

Generally, the kit matrix can include parameters determining how a content object will appear in a template. Typically, one or more parameters can be implemented to define a content object in a template. In some instances, the parameters can be different from template to template. For instance, "Content Object 1" has differing parameters in "Template 1" and "Template 2." As an example, FIG. 4B shows that "Content Object 1" is an image having different maximum and minimum resolutions in "Template 1" and "Template 2." Further, a size of the image is different in "Template 1" than in "Template 2."

The matrix chart 250 is one example of a matrix chart that can be implemented in the present invention to interconnect content objects in different templates of a kit. As shown in the matrix chart 250, "Content Object 1" can be included in "Template 1," "Template 2," and "Template N." A correlation between each of the content objects and the templates included in the kit are illustrated in matrix chart 250.

The first example chart 260 and the second example chart 270 include information that can be included in metadata of the templates. As shown, information can include a description of which template is being described and information about the content object. Information about the content object can include, but is not limited to, what type or category is the content object, any rules related to the content object, and which templates the content object is included in.

An Embodiment of a Multi-Template Kit System

Figure 5:
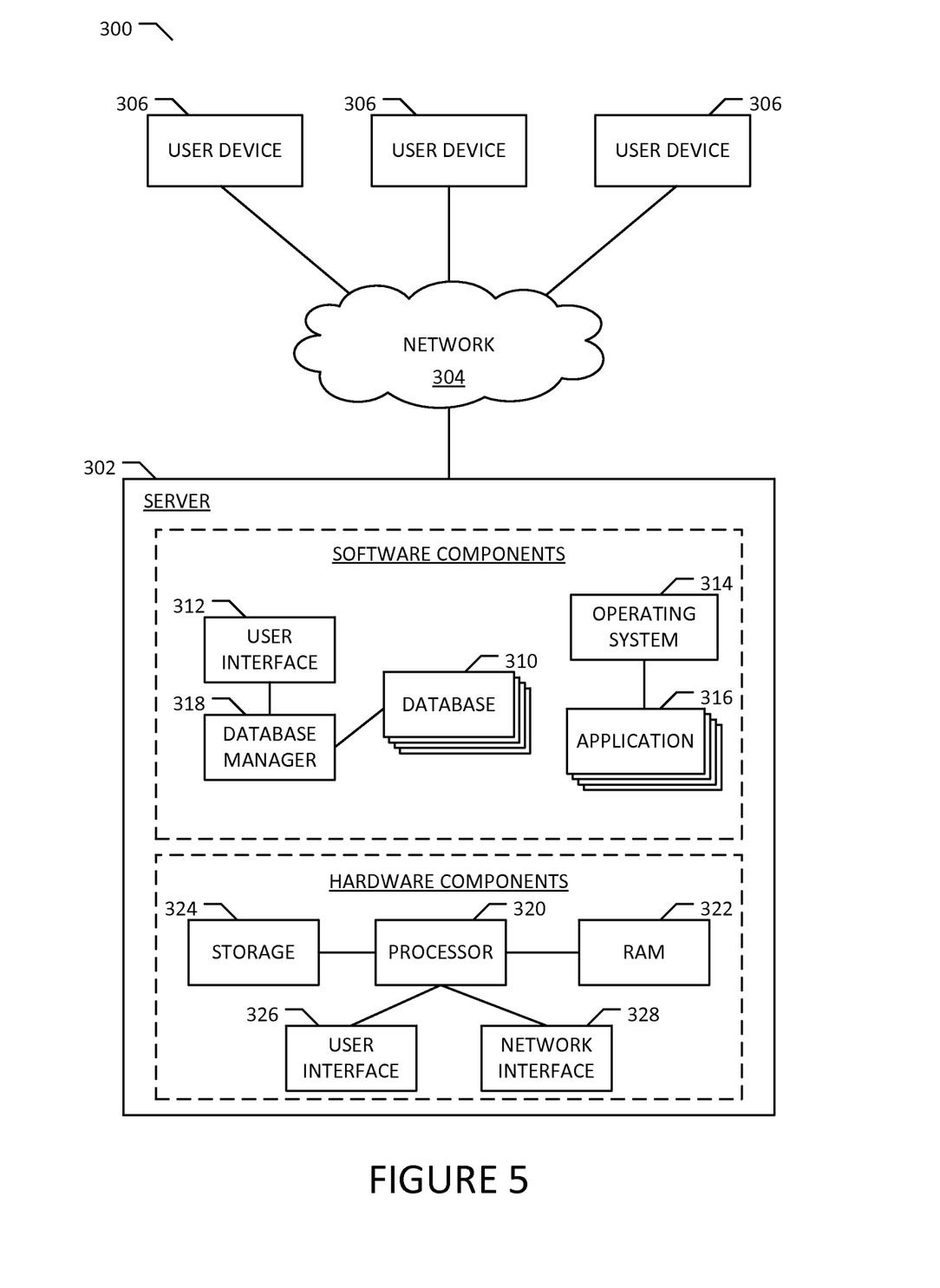
FIG. 5 is a block diagram of a multi-template kit system according to one embodiment of the present invention.

Referring to FIG. 5, a detailed diagram of an embodiment 300 showing a template kit system is illustrated. The template kit system 300 can be implemented to create a kit having a plurality of templates. The kit can be implemented in a communications campaign to provide a consistent feel to a plurality of templates in the kit.

Generally, the template kit system 300 can include a server 302, a network 304, and one or more user devices 306.

Generally, a repository of template kits can be stored in the server 302. In one embodiment, the repository of template kits can be stored in the one or more databases 310. It is to be appreciated that the repository of template kits can be stored externally to the server 302. For instance, the databases 310 can be remotely located from the server 302. Typically, a user can access the database 310 and search, query, filter, and/or prioritize the repository of template kits. For instance, the database 310 can be accessed through a web interface. In another instance, the user can have direct access to the database 310. For example, the server 302 can include a user interface or web based interface 312 to access the database 310. It is to be appreciated that a kit can include communication materials, templates, and/or documents, of one or more media types or file formats that may be defined as a group serving a specific purpose. Generally, the templates associated with the kit of communication materials can be coordinated in terms of look, feel, style, copy, content, or other aspects.

The server 302 can represent a server or another powerful, dedicated computer system that can support multiple user sessions. In some embodiments, the server 302 can be any type of computing device including, but not limited to, a personal computer, a game console, a smartphone, a tablet, a netbook computer, or other computing devices. In one embodiment, the server 302 can be a distributed system wherein server functions are distributed over several computers connected to a network. The server 302 can have a hardware platform and software components.

The software components of the server 302 can include the one or more databases 310 which can store a plurality of template kits. The software components can also include an operating system 314 on which various applications 316 can execute. A database manager 318 can be an application that runs queries against the databases 310. In one embodiment, the database manager 318 can allow interaction with the databases 310 through an HTML user interface on a user device 306.

The hardware platform of the server 302 can include, but is not limited to, a processor 320, random access memory 322, and nonvolatile storage 324. The processor 320 can be a single microprocessor, multi-core processor, or a group of processors. The random access memory 322 can store executable code as well as data that can be immediately accessible to the processor. The nonvolatile storage 324 can store executable code and data in a persistent state.

The hardware platform can include a user interface 326. The user interface 326 can include keyboards, monitors, pointing devices, and other user interface components. The hardware platform can also include a network interface 328. The network interface 328 can include, but is not limited to, hardwired and wireless interfaces through which the server 302 can communicate with other devices including, but not limited to, the user devices 306.

The network 304 can be any type of network, such as a local area network, wide area network, or the Internet. In some cases, the network 304 can include wired or wireless connections and may transmit and receive information using various protocols.

The one or more user devices 306 can be any type of computing device on which a browser can operate. Examples of such devices can include, but are not limited to, desktop computers, laptop computers, tablet computers, mobile telephones, game consoles, network appliances, or any other web-enabled devices. In an embodiment, the user devices 306 can have various hardware platforms on which a browser can execute. The browser can be used to access the HTML user interface of the database manager 318. In one instance, the system can execute functional operations by virtue of service calls to a service-based processing system.

In a typical implementation, a user can access the template database 310 via the user device 306. Generally, the user can run a kit creation application to access the template database 310 and create a multi-template kit. The kit creation application can be implemented to select one or more templates to include in a kit. For instance, the user can select one or more templates included in the template database 310 to use in the kit.

After determining which of the templates are to be included in the kit, the kit creation application can define rules that govern each of the templates in the kit and the kit itself. Typically, each template can have a set of predefined rules that govern the template. For instance, the predefined rules may include a shape for the template and a maximum resolution for any image to be included in the template. In one embodiment, the kit creation application can present the user with a list of rules to define for the kit. It is to be appreciated that a variety of rules can be predefined for each template and the kit overall. It is to be appreciated that the process may be linear, or may be executed in a parallel or iterative fashion.

After defining the rules governing the kit, the user can then start defining content objects included in each of the templates. Generally, the kit creation application can determine which of the content objects are included in more than one template and create a kit matrix to map correlations of content objects in the kit. The kit creation application can use the kit matrix to update content objects when they are updated in any of the templates. For instance, the user may define an image for a content object included in a first template. The kit creation application can use the kit matrix, or any other method of recording interdependent relationships, to determine if the content object is included in any of the other templates, and if the content object is, the kit creation application can update the appropriate templates.

Generally, content objects included on two or more templates of kit can be linked and/or governed by logical relationships, business rules, artistic standards, creative standards, or branding standards to achieve an intended objective in regard to the kit. In one embodiment, content objects included on two or more templates of kit can be linked and/or governed by logical relationships, business rules, artistic standards, creative standards, or branding standards to enforce constraints, meet design guidelines, and/or meet compliance requirements.

Typically, templates can include logical coding that can specify rules governing a selection and a presentation of content objects in each template included in the kit. For instance, the logical coding can be implemented to enforce consistency across various templates. In another instance, the logical coding can be implemented to provide logical relationships that govern the selection and the presentation of content objects appearing across the collection of templates. For example, logical coding including, but not limited to, like if-then-else statements, inclusion statements, exclusion statements, and other such relational and logical rules.

Generally, selections and/or manipulations of content objects in any one template of the kit can flow through the other templates in the kit according to the specified relational and logical rules.

In one embodiment, information characterizing relationships between a content object and a template in a kit can include amplifying information that can characterize the relationship of the content object in different templates relative to a reference. Generally, one or more templates within a kit can serve as a reference for other templates within the kit. Relationships between the reference template and the referred templates can be defined and varied from one kit to another as necessary to achieve objectives for the kit. For instance, one of the templates included in a kit can be designated as a master template. As such, variations of a content object may be defined for other templates which include that content object based on the content object in the master template. In another instance, no templates may be defined as a master template. Generally, any changes to content objects in a template would flow through to corresponding content objects appearing in any other template within the kit.

Alternative Embodiments and Variations

The various embodiments and variations thereof, illustrated in the accompanying Figures and/or described above, are merely exemplary and are not meant to limit the scope of the invention. It is to be appreciated that numerous other variations of the invention have been contemplated, as would be obvious to one of ordinary skill in the art, given the benefit of this disclosure. All variations of the invention that read upon appended claims are intended and contemplated to be within the scope of the invention.

We claim:

1. A method performed on a processor, the method comprising:
    creating a kit, the kit having a master template and a plurality of templates;
        wherein (i) each of the plurality of templates includes one or more content objects, and (ii) the master template includes all of the one or more content objects;
    defining a first content object included in the master template;
    determining if the first content object is included in one or more of the plurality of templates;
        wherein the first content object is not included in at least one of the plurality of templates;
    updating each of the plurality of templates having the first content object;
    defining a second content object included in a first template of the plurality of templates, the second content object being updated in the first template while a user is viewing the first template;
    determining if the second content object is included in one or more of the plurality of templates; and
    updating the master template and each of the plurality of templates having the second content object after the second content object is updated in the first template;
    monitoring each content object included in the plurality of templates to determine if any of the content objects have been changed; and
    updating each of the plurality of templates having the content object that was changed.

2. The method of claim 1, further comprising the steps of:
    defining a third content object included in a second template of the plurality of templates, the third content object being updated in the second template while the user is viewing the second template;
    determining if the third content object is included in one or more of the plurality of templates; and
    updating the master template and each of the plurality of templates having the third content object after the third content object is updated in the second template.

3. The method of claim 1, wherein creating the kit includes defining one or more rules adapted to control the kit.

4. The method of claim 3, wherein the one or more rules includes defining a kit matrix adapted to link content objects included in the master template and at least one of the plurality of templates.

5. The method of claim 4, wherein (i) the kit matrix includes parameters for each of the content objects, and (ii) the parameters for the first content object are different in at least two of the templates.

6. The method of claim 5, wherein the parameters determine how a content object appears in a template.

7. A multi-template kit system comprising:
    at least one processor;
    at least one computer-readable storage media having stored thereon computer-executable instructions that, when executed by the at least one processor, causes the system to perform a method, the method comprising the following:
        creating a kit, the kit having a master template and a plurality of templates;

wherein (i) each of the plurality of templates includes one or more content objects, and (ii) the master template includes all of the one or more content objects;
defining a first content object included in the master template;
wherein the first content object is not included in at least one of the plurality of templates;
determining if the first content object is included in one or more of the plurality of templates;
updating each of the plurality of templates having the first content object;
defining a second content object included in a first template of the plurality of templates, the second content object being updated in the first template while a user is viewing the first template;
determining if the second content object is included in one or more of the plurality of templates; and
updating the master template and each of the plurality of templates having the second content object after the second content object is updated in the first template;
monitoring each content object included in the plurality of templates to determine if any of the content objects have been changed; and
updating each of the plurality of templates having the content object that was changed.

8. The multi-template kit system of claim 7, the method further comprising the steps of:
defining a third content object included in a second template of the plurality of templates, the third content object being updated in the second template while the user is viewing the second template;
determining if the third content object is included in one or more of the plurality of templates; and
updating the master template and each of the plurality of templates having the third content object after the third content object is updated in the second template.

9. The multi-template kit system of claim 7, wherein creating the kit includes defining one or more rules adapted to control the kit.

10. The multi-template kit system of claim 9, wherein the one or more rules includes defining a kit matrix adapted to link content objects included in the master template and at least one of the plurality of templates.

11. The multi-template kit system of claim 10, wherein the kit matrix includes parameters for each of the content objects.

12. The multi-template kit system of claim 11, wherein the parameters determine how a content object appears in a template.

13. The multi-template kit system of claim 12, wherein the parameters vary from template to template.

14. A method performed on a computer processor, the method comprising:
creating a kit, the kit having a plurality of templates;
defining a first content object included in a first template, the first content object being updated in the first template while a user is viewing the first template;
determining if the first content object is included in one or more of the plurality of templates;
updating each of the plurality of templates having the first content object;
defining a second content object included in a second template, the second content object being updated in the second template while the user is viewing the second template;
determining if the second content object is included in one or more of the plurality of templates;
updating each of the plurality of templates having the second content object;
defining a third content object included in a third template, the third content object (i) being updated in the third template while the user is viewing the third template, (ii) included in the second template, and (iii) not included in the first template;
updating the third content object in the second template and any of the plurality of templates including the third content object after updating the third content object in the third template.

15. A method performed on a computer processor, the method comprising:
creating a kit having a plurality of templates, wherein each of the templates includes one or more content objects;
wherein (i) content objects included in two or more templates are interconnected to each other, and (ii) each interconnected content object is automatically updated when one of the interconnected content objects is changed;
determining a first interconnected object of the interconnected content objects in a first template of the plurality of templates has been changed;
updating each of the plurality of templates having the first interconnected content object with the changed content object;
determining a second interconnected object of the interconnected content objects in a second template of the plurality of templates has been changed, the second interconnected object not being included in the first template;
updating each of the plurality of templates having the second interconnected content object with the changed content object.

* * * * *